US 6,427,168 B1

(12) United States Patent
McCollum

(10) Patent No.: US 6,427,168 B1
(45) Date of Patent: Jul. 30, 2002

(54) ARCHITECTURE FOR SYSTEM MONITORING USING HIGH-PERFORMANCE PROVIDERS

(75) Inventor: Raymond W. McCollum, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/361,642

(22) Filed: Jul. 26, 1999

(51) Int. Cl.[7] .............................................. G06F 13/00
(52) U.S. Cl. ...................................... 709/224; 709/300
(58) Field of Search ................................ 709/200, 201, 709/203, 217, 218, 219, 223, 224, 300

(56) References Cited

U.S. PATENT DOCUMENTS

| | | | | |
|---|---|---|---|---|
| 6,081,798 A | * | 6/2000 | Johnson et al. ............... 706/54 |
| 6,226,650 B1 | * | 5/2001 | Mahajan et al. ............. 707/201 |
| 6,263,361 B1 | * | 7/2001 | Hoyer et al. ................. 709/203 |
| 6,266,695 B1 | * | 7/2001 | Huang et al. ................ 709/223 |
| 6,339,750 B1 | * | 1/2002 | Hoyer et al. ................. 702/182 |

* cited by examiner

Primary Examiner—Moustafa M. Meky
(74) Attorney, Agent, or Firm—The Law Offices of Albert S. Michalik, PLLC

(57) ABSTRACT

A method and architecture that enables performance monitoring in a centralized information source model. A refresher is provided into which a client process such as a management application may add information objects obtained from a common information model object manager (the CIMOM 64). If the client a returned object to the refresher, this signals the CIMOM 64 that the client process wants performance monitoring. If the CIMOM 64 determines that the information comes from a high performance provider, the CIMOM 64 loads the high-performance provider into the client process space. A refresh call updates the objects via the high performance providers without needing to again contact the CIMOM 64, resulting in a highly efficient mechanism for providing information on a regular basis. Multiple providers may be in a single refresher, multiple refreshers may be used, and refreshers may be loaded within other refreshers, providing additional flexibility and ease of use to a client process. Remote objects may be put into a refresher, whereby the method and architecture use the CIMOM 64 for the remote information. Shared memory techniques may also be used for obtaining performance information.

41 Claims, 9 Drawing Sheets

ARCHITECTURE FOR SYSTEM MONITORING USING HIGH-PERFORMANCE PROVIDERS

FIELD OF THE INVENTION

The invention relates generally to computer systems or networks, and more particularly to an improved system and method for monitoring computer system information.

BACKGROUND OF THE INVENTION

Network administrators run management applications to perform such tasks as detect machines on a network, inventory software and hardware configurations, and send key information back to a central database. Such management applications receive this information from a variety of disparate sources.

By way of example, typical sources for management information include databases and the underlying system. For example, a database may be queried by a management application, or a system call may be made to determine the state of some device, e.g., the free space of a disk. Alternatively, some management applications interface directly with instrumentation that can pull information from device drivers or other software components. For example, a management application may communicate with remote disk drive software to determine how much free space remains on a network drive. As can be readily appreciated, the wide variety of management applications and resources, protocols, formats, frameworks, and so on made it difficult and complicated for management applications and the users thereof to obtain the desired information.

A significant improvement for accessing and returning management information is described in U.S. patent application Ser. No. 09/020,146, still pending wherein a common information model object manager (the CIMOM) is provided to isolate management applications from the various sources of management information, while providing a single, uniform way to access the information. With the CIMOM, each management application submits queries to the CIMOM in a uniform way. The CIMOM then communicates with one or more sources of the information, known as providers, to return an appropriate reply. The CIMOM is intelligent in that it can decompose queries into requests from multiple providers and synthesize the results into a single response, filter excess information, work with the capabilities of the providers, and so forth.

While the CIMOM thus provides significant benefits in accessing management applications, the CIMOM was not intended for handling high-speed and/or highly frequent queries. As a result, the CIMOM was not designed for performance monitoring. As is known, performance monitoring enables a system user (administrator) to analyze fast changing system operations, e.g., on the order of thousands of measurements per second, such as packets per second over a network, hard disk I/O operations per second, CPU utilization, or page faults per second. Performance counters are presently used to provide a graphical representation of those operations that updates at a user-selectable rate, e.g., once a second, every two seconds and so on.

However, client calls to the CIMOM cross a process boundary, resulting in thread context switching and other delays that significantly influence performance counters and measurements. Indeed, the frequent calls to the CIMOM were determined to account for a significant percentage of the performance measurements. As a result, even though the CIMOM is capable of communicating with the information providers that provide the information desired in performance monitoring, the CIMOM has heretofore been unable to adequately perform performance monitoring.

SUMMARY OF THE INVENTION

Briefly, the present invention provides a method and architecture that enables performance monitoring while using a centralized information source model such as CIM. To accomplish this, in general, when a client (e.g., a management application) requests performance measurements from high-performance providers, the CIMOM loads the appropriate providers of the information into the client process space. As a result, performance monitoring does not cross a process boundary, and thus does not significantly impact the monitoring measurements. More particularly, when a client process requests information through a proxy and the CIMOM, the CIMOM accesses the appropriate provider or providers, and returns an object to the client process containing the requested information. If the client places the object into a refresher (included in the same component, e.g., code, as the proxy), this signals that the client process wants performance monitoring. If the provider of the object information is a high-performance provider, the proxy requests the CIMOM to load an instance that (high-performance) provider into the client process space. A refresh application programming interface (API) call to the proxy is made available to the client, and when this call is received, the proxy knows to instruct the objects in the refresher to update themselves via the providers loaded in the client process space, rather than contact the CIMOM for the requested information.

Other aspects of the present invention include the ability to have objects for multiple providers in a refresher, whereby a client can obtain multiple performance measurements via a single API call, for example, once every one second. There can be multiple refreshers in the client process space, so that, for example, a client can refresh monitoring information at different rates. Also, refreshers may be loaded within other refreshers, providing additional flexibility and ease of use to a client.

The method and architecture of the present invention further enable remote high performance monitoring over a network, wherein a client may include local, remote or a mix of local and remote objects into a refresher. Remote providers are contacted through the CIMOM, even if those remote providers are high-performance providers. Another aspect of the present invention involves the use of shared memory techniques to overcome problems of crossing a process boundary for obtaining information. For example, separate processes (e.g., SQL server) that perform their own performance measurements (e.g., via performance counters) can be efficiently used for high-performance monitoring through shared memory techniques.

Other advantages will become apparent from the following detailed description when taken in conjunction with the drawings, in which:

DETAILED DESCRIPTION OF THE PREFERRED EMBODIMENT

Exemplary Operating Environment

Figure 1:
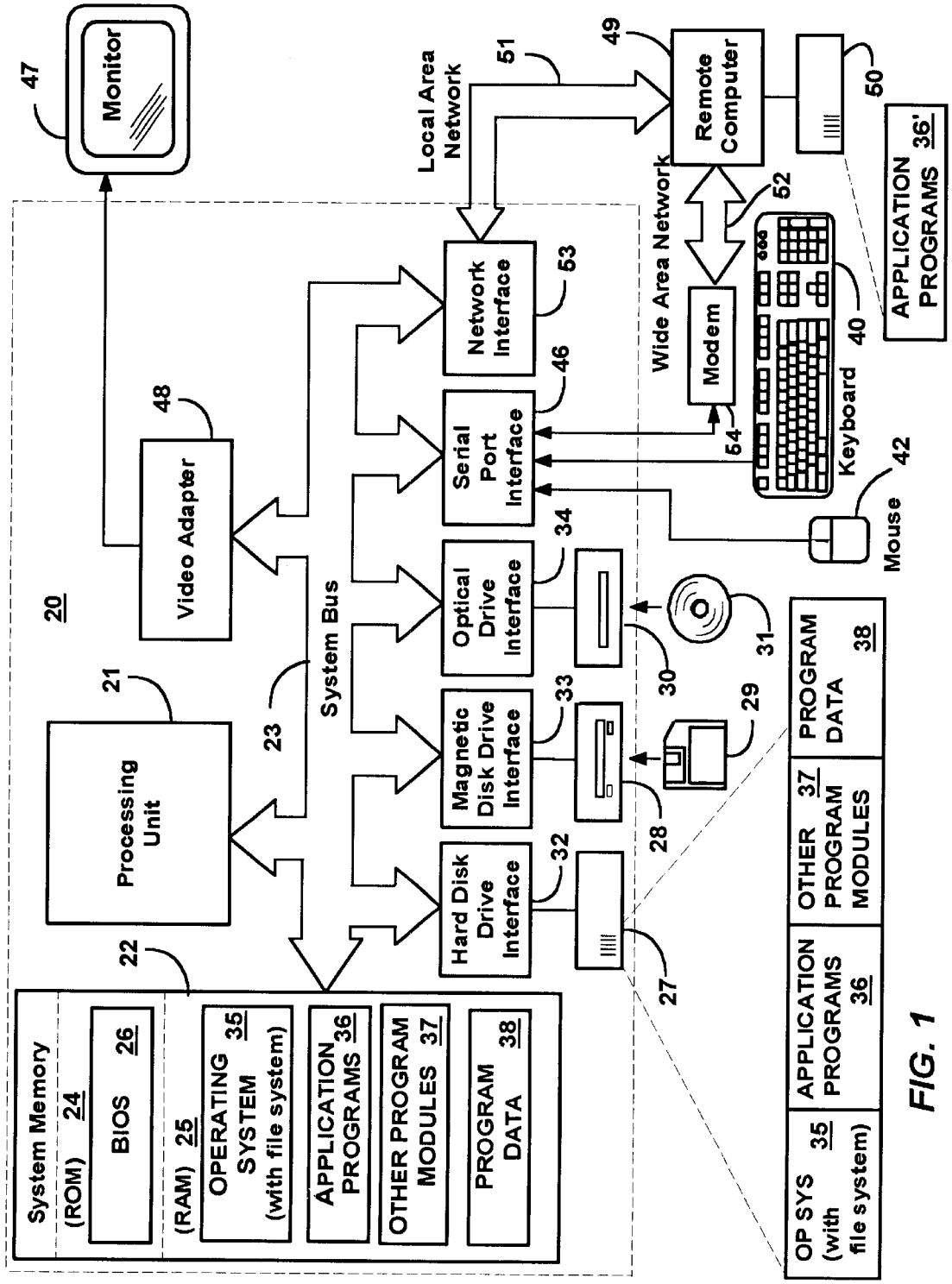
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The Common Information Model

By way of general background, in a common information model (CIM) installation 60 (FIG. 2), a process acting in the role of a client 62 makes management requests, while a process acting as a server, i.e., a CIM object manager, or the CIMOM 64, satisfies each request via one or more providers $66_1$–$66_n$ and returns an appropriate response via uniformly rendered managed objects. CIM and the CIMOM 64 are further described in U.S. patent application Ser. No. 09/020, 146, still pending, assigned to the assignee of the present invention, and hereby incorporated by reference herein.

Figure 2:
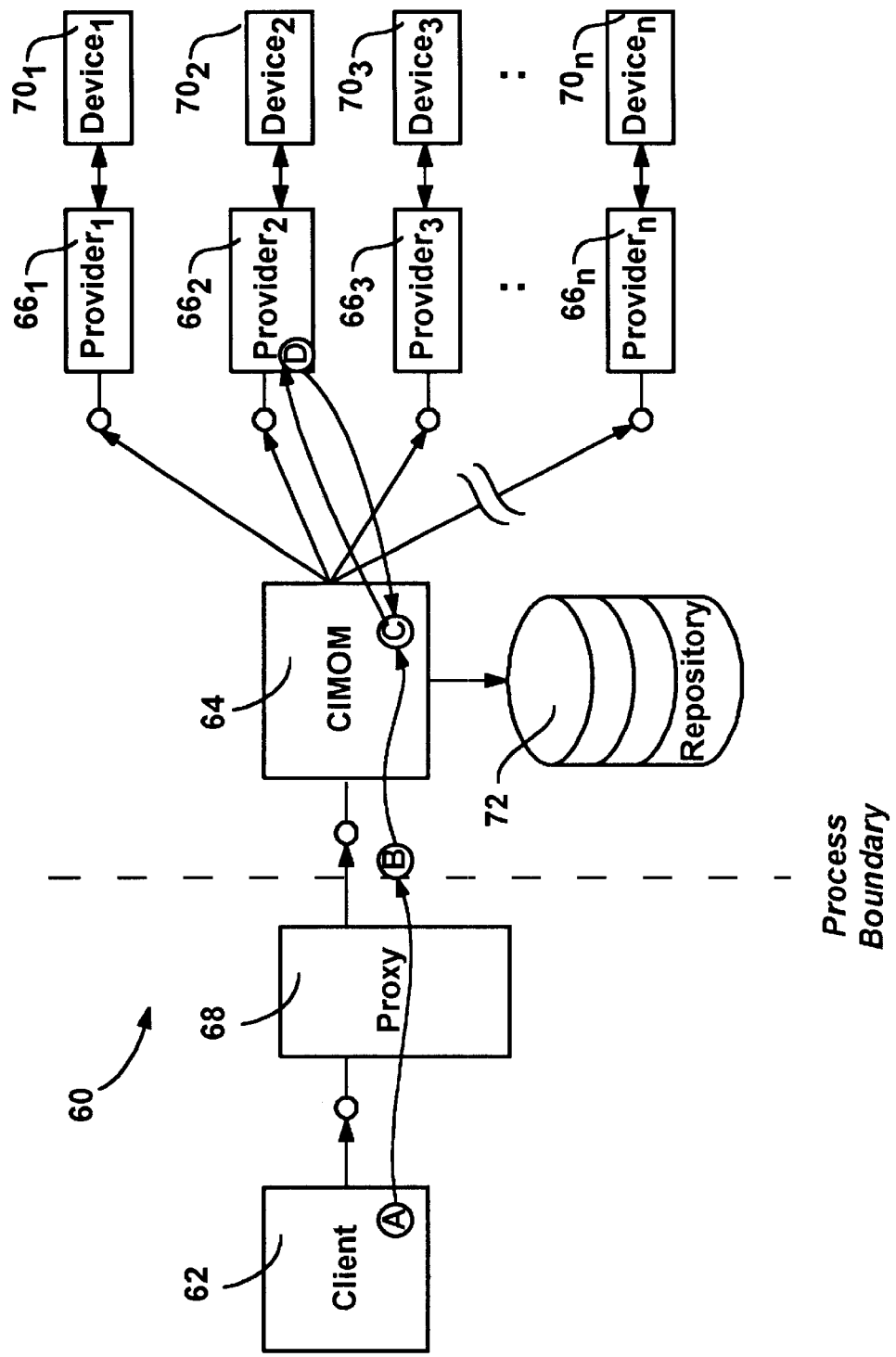
FIG. 2 is a block diagram generally representing a general architecture of the common information model for working with management information according to the prior art.

As shown in the CIM installation 60 of FIG. 2, the client process 62 (e.g., a management application) communicates management information requests through a proxy 68 to the CIMOM 64. At least part of the communication is preferably via COM (Component Object Model) and/or DCOM (Distributed Component Object Model), i.e., by invoking methods of objects in the CIMOM 64 server over an underlying protocol such as TCP, however any suitable interprocess communication mechanism may be alternatively employed. For example, the client process 62 may communicate with the CIMOM 64 using XML/CIM over HTTP. DCOM, XML/CIM and HTTP are well-documented, and as will become apparent below, are not necessary to the present invention, as any protocol capable of passing object information may be used. As such, for purposes of simplicity, DcOM, XML/CIM and/or HTTP will not be described in detail herein.

By way of example of how management information is exchanged, in FIG. 2, (wherein circled letters A–D and accompanying curved arrows represent threads which may be used in the communication), the client process 62 starts a request on thread A, which is appropriately packaged up by the proxy 68. The thread is then switched to thread B in order to cross the process boundary to the CIMOM 64, which typically switches to thread C in order to communicate with an information provider (e.g., $66_2$). The provider $66_2$ may return a response on thread D, which then works its way back to the client process 62 via such thread context switching. Note that such thread context switching is a relatively expensive operation.

The CIMOM 64 is a server which implements a large subset of the communication protocol, and which switches roles so as to act as a proxy 68 on behalf of client process 62 requests. As part of its function, the CIMOM 64 passes the client process 62 requests to one or more appropriate servers known as object providers (or simply providers) $68_1$–$68_n$. Providers are the sources of management information, and typically obtain their information directly from a system resource such as a hardware device or database, although a provider may obtain some of its provided information from another provider, e.g., via the CIMOM 64. By way of example, one type of provider (e.g., $68_2$) may be implemented in a software driver or the like supplied by a vendor to accompany a hardware device $70_2$ such as a disk drive.

In order to service a request, the CIMOM 64 accesses a CIM repository (database) 72 in order to determine which object provider or providers to contact (if any). More particularly, when the client process 62 sends a request to the CIMOM 64, the client process 62 will access the CIM repository 72, which may have the information therein if static, and/or will provide the information necessary for locating the appropriate provider or providers which can satisfy the request. Thus, the CIMOM 64 will either directly satisfy a request or in essence become a client process itself and forward the request to an appropriate provider 68.

Thus, through the CIMOM 64, client processes are relieved of the burden of locating and directly managing a multitude of devices on the network. Instead, the CIMOM 64 hides the management complexity by distributing the request to the appropriate providers 66. The providers $66_1$–$66_n$ gather the necessary data from the devices $70_1$–$70_n$ using vendor or protocol-specific mechanisms such as DMI, SNMP, CMIP or a proprietary mechanism, and return the data to the requesting the CIMOM 64.

Providers are components (e.g., dynamic link libraries, or DLLs) which are essentially more primitive in nature than the CIMOM 64 itself. As a result, in order for the CIMOM 64 to present uniform capabilities to the client process 62, the CIMOM 64 may simulate any operations not directly supported by a provider, by executing progressively simpler requests until a request is understood by the provider. The CIMOM 64 then synthesizes the results and returns them to the client process 62 as though the provider or providers had been capable of the original complex request submitted by the client process 62.

By way of example, if a client process 62 submits a query to the CIMOM 64 requesting information on a disk drive, the CIMOM 64 may return an instance of the following "Disk" class object thereto:

```
{
    Volume = "DISKC";
    FileSystem = "XFS";
    TotalCapacity = 240000000;
    FreeSpace = 180000000;// Dynamically supplied by provider
};
```

Note that since the FreeSpace parameter is highly volatile, in a typical implementation the value would be supplied by a provider 68, rather than being a stored or static value. The CIMOM 64 is capable of retrieving both the static and dynamic information from various sources including the CIM database 72 and/or appropriate providers such as $68_2$, and returning the object instance to the client process (application) 62.

The CIMOM 64 is capable of receiving potentially high level SQL queries, decomposing those queries as necessary, and communicating with a variety of sources, possibly in a series of very primitive operations, to produce a result. The operations are transparent to the client process 62, as the result is returned in the same manner regardless of the sources that supplied the information. For example, a query such as—select * from LogicalDisk where FreeSpace <20000000—intends to have returned only instances that meet the less than twenty megabyte criteria, and not all instances of the LogicalDisk class. If the provider or providers of this information are unable to limit their retrieval based on this criteria, the CIMOM 64 provides the correct result set by a post-retrieval filtering operation. The CIM object manager thus performs operations that complement the capabilities of providers in order to uniformly render managed objects to management applications. Because some providers have substantially more capabilities than other providers, the CIMOM 64 attempts to operate each provider with its maximum capabilities, lowering its level for requesting information from a provider until the provider can satisfy the request, e.g., by reducing the complexity of a query for that provider.

Performance Monitoring

As described above, for performance monitoring in a CIM or similar system management environment, obtaining information via the CIMOM 64 in the above-described traditional manner causes degradation of performance measurements. The present invention is directed to an improved method and architecture that enables performance monitoring of system components in a CIM (or similar) environment while only minimally impacting the measurements.

In accordance with one aspect of the present invention, there is provided a method and architecture wherein a client process 62 selectively indicates to the CIMOM 64 that it desires continuous performance monitoring (in contrast to a one-time request for information). When such an indication is received, the CIMOM 64 enables the information to be provided in a manner that does not require the crossing of a process boundary. In practice, this allows performance measuring on the order of many thousands of operations per second without significant degradation resulting from the measuring itself.

Figure 3:
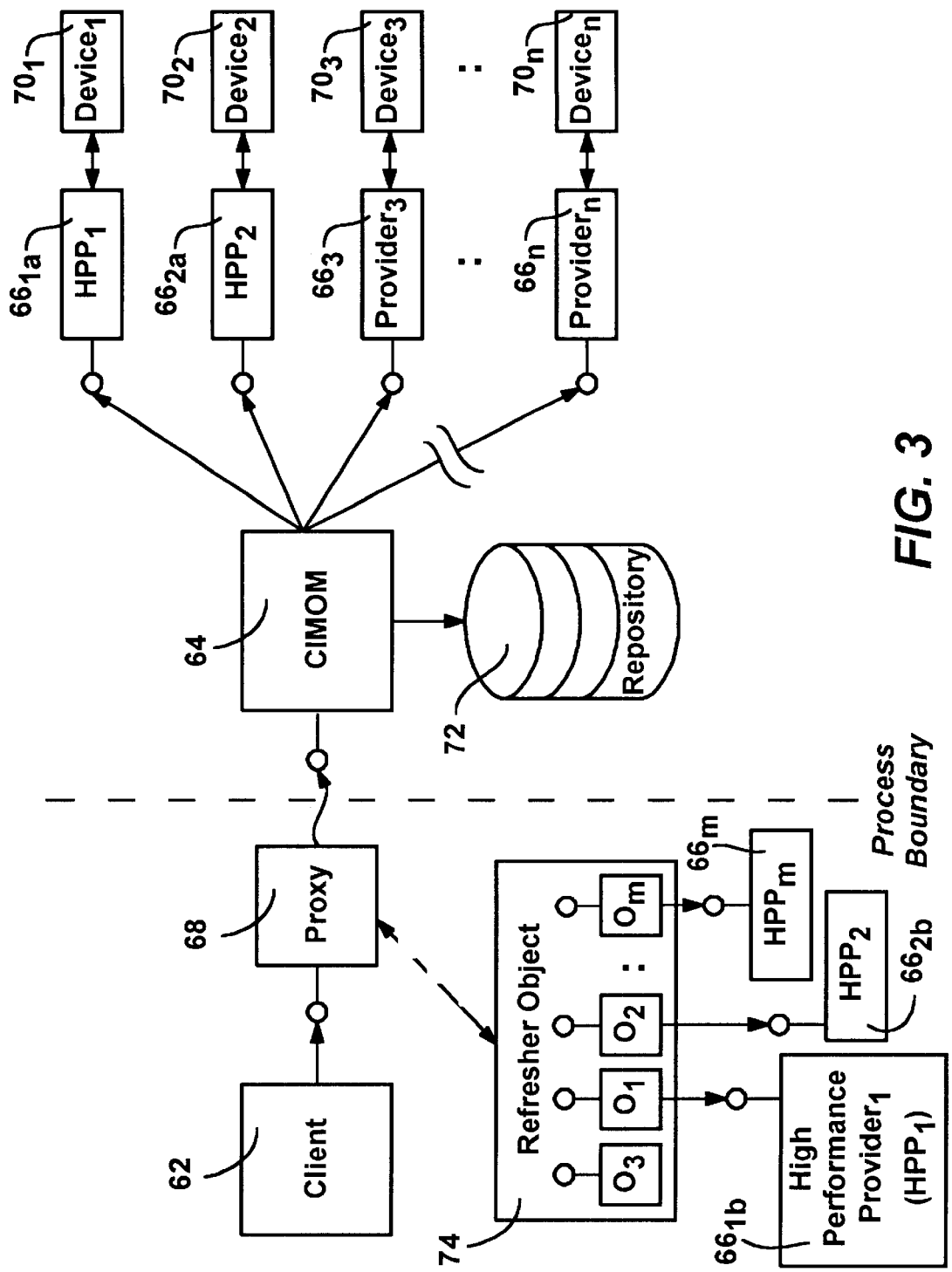
FIG. 3 is a block diagram generally representing a general architecture for high performance monitoring of information in accordance with an aspect of the present invention.

To accomplish performance monitoring, as shown in FIG. 3, the client process 62 is provided with a refresher (object) 74. For efficiency, the refresher 74 is included in the same component (code) as the proxy 68 through which the client process 62 communicates with the CIMOM 64, (as indicated by the dashed line therebetween), however as will be understood, the proxy 68 and refresher 74 alternatively may be separate components that communicate with one another. In any event, when a response to a client process 62 query is returned by the CIMOM 64, it is in a response object, as described above, typically used by the client process 62 and then discarded. However, in keeping with the present invention, if the client process 62 puts the response object e.g., $O_1$ in the refresher 74, i.e., logically attaches it thereto, the client process 62 signals to the proxy 68 that it wants continuous performance monitoring of that object. In turn, the proxy 68 notifies the CIMOM 64 of this signal, whereby the CIMOM 64 may decide to load an instance of the provider (or providers) corresponding to that response object into the client process space, i.e., if the provider is a high-performance provider (HPP), as described below.

The providers for used in performance monitoring are normally designed for this purpose, i.e., each provides desired information from a performance counter or the like, without relying on the CIMOM 64 to synthesize the information, by directly updating (modifying or replacing with a new object instance) its corresponding object in the refresher 74 (FIG. 3). Such providers are referred to herein as high-performance providers, and although designed for operation in the client process space, high-performance providers are also designed to provide information via the CIMOM 64. Indeed, before the client process 62 puts a response object (e.g., $O_2$) received from a high-performance provider (e.g., $HPP_{2A}$) into the refresher 74, the client process 62 first receives the response object $O_2$ from the high-performance provider $HPP_{2A}$ via the CIMOM 64.

It should be noted that the client process 62 also may put objects in the refresher 74 that do not have high-performance providers associated therewith. In general, the client process 62 is not aware of the use of high-performance providers, as the client process 62 simply places an object (e.g., $O_2$) that it wants refreshed into the refresher 74 and requests an update when desired, as described below. Objects (e.g., $O_3$) that do not have associated high-performance providers are updated via the CIMOM 64. Accordingly, if it is expected that a provider will be used for performance monitoring, the provider should be designed as a high-performance provider. For example, a provider that reports disk I/O operations likely should be a high performance provider, while a provider that returns disk free space is less likely to used for monitoring and thus may be a regular provider, although it can be a high performance provider if desired, such as for efficiency.

Figure 4:
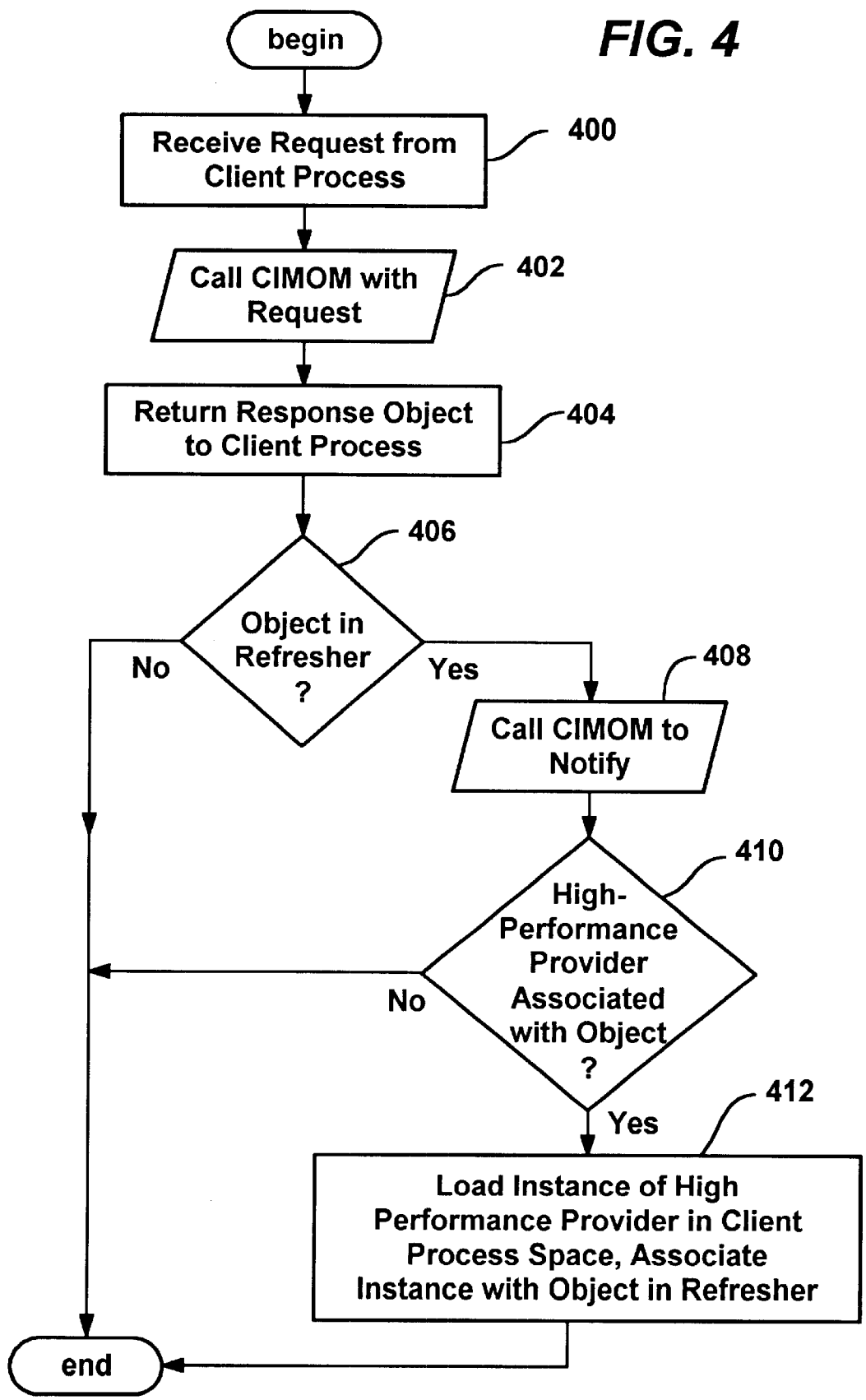
FIG. 4 is a flow diagram generally representing a process for setting up objects for system performance monitoring in accordance with an aspect of the present invention.

FIG. 4 generally represents the logic in the proxy 68 and the CIMOM 64 for handling high performance providers in accordance with an aspect of the present invention, beginning at step 400 wherein the proxy 68 receives a request from the client process 62. At step 402 the proxy 68 packages and sends the request to the CIMOM 64, which locates and accesses one or more appropriate providers to handle the request. The response is returned to the client process 62 as an object, via the proxy 68 (step 404).

As represented by step 406, if at any time thereafter the client process 62 places the response object into the refresher 74, (the same code as the proxy 68), the proxy 68 notifies the CIMOM 64 via a method call thereto at step 408. Note that the client may set up refreshers via calls to the proxy 68, and may also add objects to refreshers via calls thereto. At step 410, the CIMOM 64 determines whether the response object placed in the refresher 74 is one associated with a high-performance provider. If so, the CIMOM 64 causes an instance of the high performance provider (e.g., $66_{2B}$) to be loaded in the client process space, and the proxy 68 associates the high performance provider $66_{2B}$ with the object $O_2$ in the refresher 74. In this manner, the client process 62 is capable of obtaining updated information without crossing a process boundary. Note that a client process 62 may place more than one object in a refresher 74, including a mix of objects that have regular providers and those that have associated high-performance providers loaded in client process space, whereby the client process 62 may update more than one object at a time.

In accordance with another aspect of the present invention, to update the object or objects in the refresher 74, there is provided a "Refresh ( )" application programming interface (API) call. When the client process 62 calls the proxy 68 via this Refresh ( ) API, the proxy 68 takes the appropriate steps to update the objects therein, as described below. More particularly, for objects that have associated high performance providers (e.g., $66_{1B}$ and $66_{2B}$) loaded in the client process space, those providers $66_{1B}$–$66_{2B}$ are instructed by the proxy 68 to update their associated objects $O_1$–$O_2$ in the refresher 74. For example, one high performance provider $66_1$ may have been counting the number of disk I/O operations since last called. When updated, the client process 62 thus has the new information via the objects in the refresher 74. By regularly (e.g., periodically) calling the Refresh ( ) API, the client process 62 may thus receive regularly updated information, and thereby output performance monitoring results.

Figure 5:
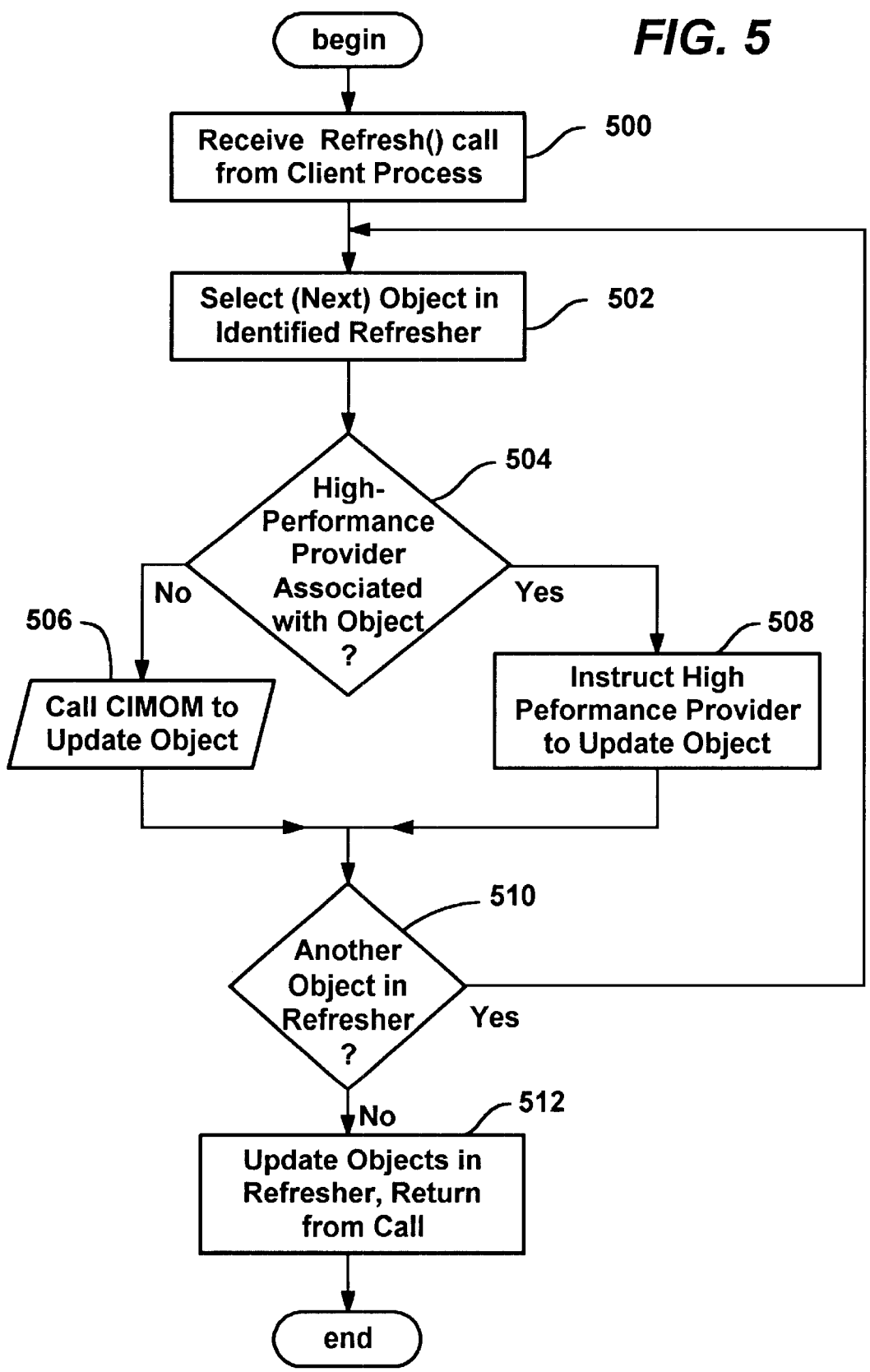
FIG. 5 is a flow diagram generally representing a process for updating objects with system performance information in accordance with an aspect of the present invention.

FIG. 5 summarizes the general logic performed by the refresher 74 in response to a Refresh ( ) API call, received at step 500. Note that a client process 62 may have more than one refresher 74, so the call identifies which refresher is desired for an update. At step 502, a first object in the identified refresher 74 is selected by the proxy 68, and at step 504, the proxy 68 makes a determination as to whether this object has a high-performance provider loaded therefor in the client process space. If not, the proxy 68 calls the CIMOM 64 to update the object at step 506, i.e., provide a new object instance to the proxy 68 for replacing the one in the refresher 74. On the other hand, if the selected object has a high performance provider associated therewith, step 508 is instead executed, whereby the proxy 68 directs the update command to the high performance provider in the client process space. In this manner, the client process 62 is able to access the updated information without a process boundary being crossed.

Figure 6:
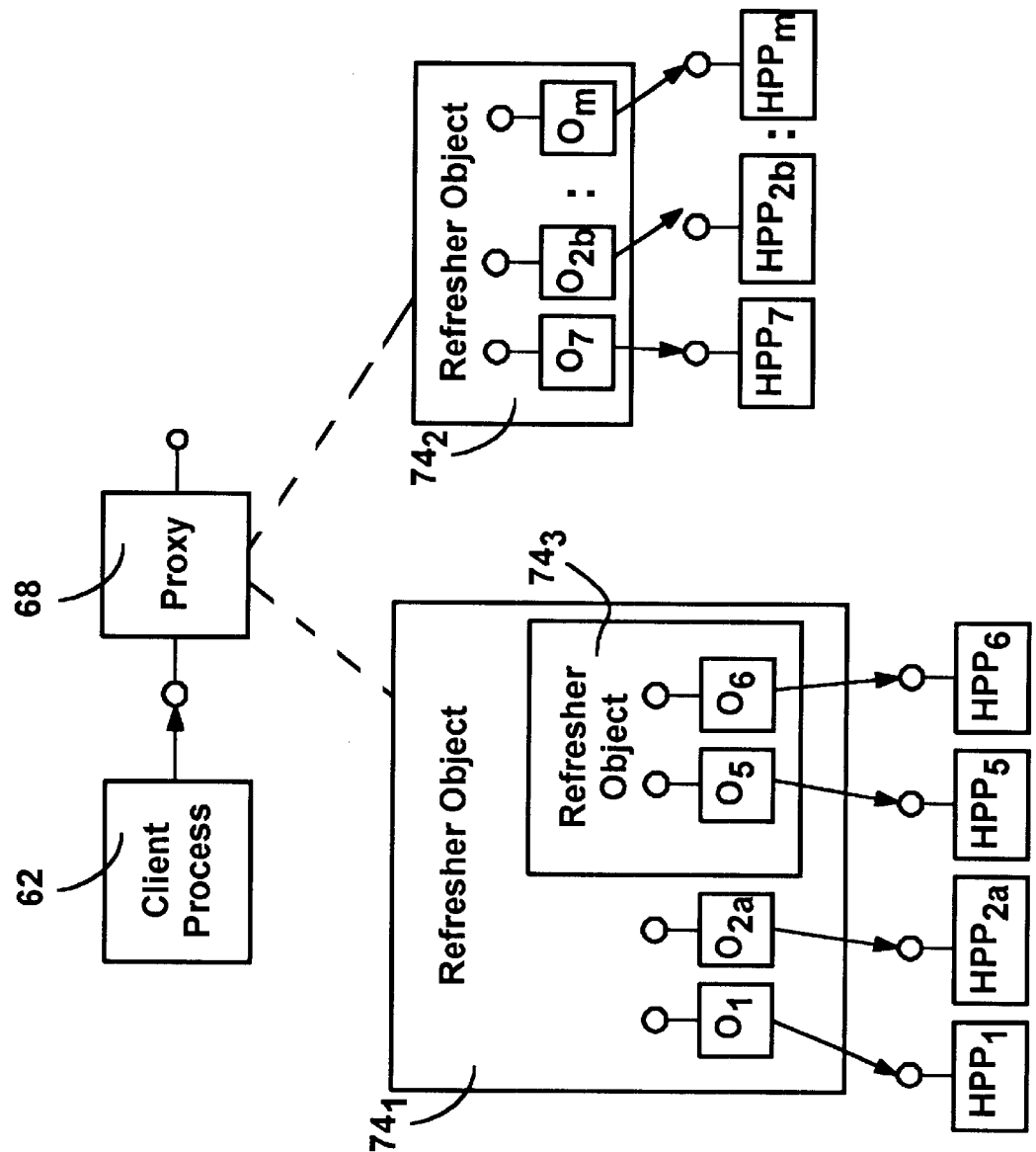
FIG. 6 is a block diagram generally representing various ways in which objects may be arranged for refreshing in accordance with an aspect of the present invention.

Step 510 represents the repeating of this process for each object in the refresher 74. When the objects are refreshed, the proxy 68 returns from the call at step 512, whereby the client process 62 has the updated information within the objects in the refresher 74. Note that the client may reread the objects as required, in between refreshes. During the refresh operation, the client does not access the objects until the refresh operation is completed, as during this execution window, the provider updates the objects. As generally represented in FIG. 6, refreshers provide a simple to use, yet highly flexible mechanism for client processes to obtain updated information. For example, as described above and as shown in FIG. 6, more than one object may be put into a refresher. Also, more than one refresher (e.g., $74_1$ and $74_2$) may be used, enabling client processes to refresh various objects at different rates, and a client process 62 may put different instances of the same object (e.g., $O_{2a}$ and $O_{2b}$) into different refreshers, e.g., $74_1$ and $74_2$. Moreover, as also represented in FIG. 6, a client may place a refresher (e.g., $74_3$) inside another refresher (e.g., $74_1$) to thereby merge one set of refresher objects with a set of objects of another refresher. For example, if a client process 62 decides to change the update frequency of one set of objects to the frequency of another set, the client process 62 may merge the objects into one refresher 74 and efficiently make a single call to update both sets.

Figure 7:
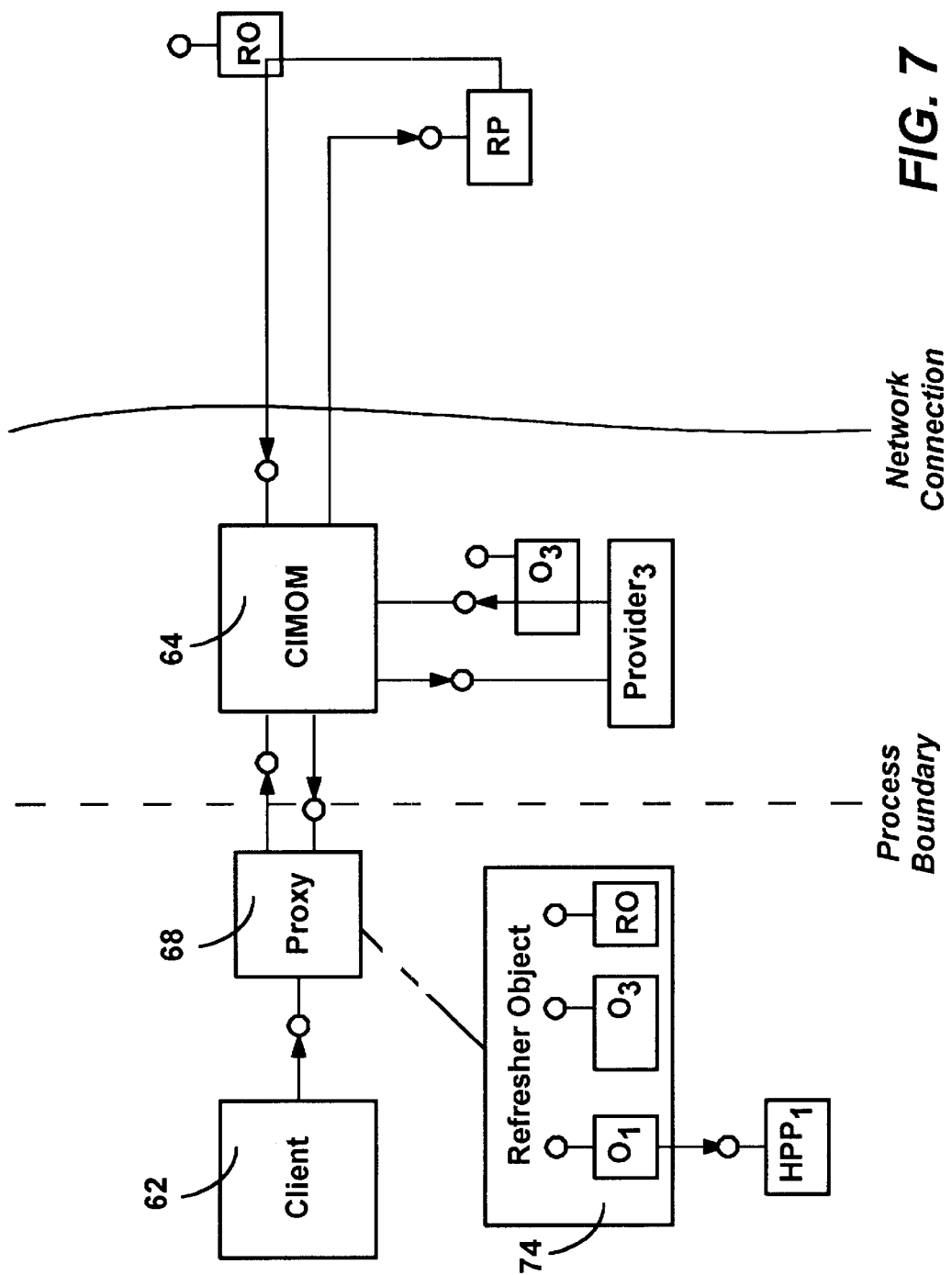
FIG. 7 is a block diagram generally representing a general architecture for performance monitoring via local and remote providers of information in accordance with an aspect of the present invention.

Turning to FIG. 7, another aspect of the invention involves the ability for a client process 62 to receive updates from providers on a remote machine. However, the CIMOM 64 does not load remote high-performance providers into the client process space, because a high-performance provider (e.g., the provider labeled RP in FIG. 6) needs to remain in the machine it is monitoring. Note that it is feasible to have a remote provider loaded into a client process space, however to obtain its information, the provider would have to communicate over the network with its machine on its own at each refresh, which is not efficient, and also is better handled by the CIMOM 64.

As a result, as shown in FIG. 7, when a provider RP is remote, the proxy 68 and the CIMOM 64 know to update the corresponding object RO in the refresher 74 via the CIMOM 64. One way in which this may be handled is for the proxy 68 to recognize the object RO as corresponding to a remote provider RP and therefore contact the CIMOM 64 for updates to such a provider's objects. Another way to handle a remote provider RP is for the CIMOM 64 to simply treat the remote provider RP as a regular provider, and not inform the proxy 68 even if the remote provider RP is a high performance provider. Thus, an instance of the provider RP will not be loaded into the client process space, and the proxy 68 will treat the provider RP as a regular provider and contact the CIMOM 64 when an updated object RO is requested.

Thus, as represented in FIG. 7, a client process 62 may get updated information directly from high performance providers (e.g., $HPP_1$) in its process space, get updated objects (e.g., $O_3$) from local, regular providers (e.g., provider$_2$) via the CIMOM 64, and get updated objects (e.g., RO) from remote (regular or high-performance) providers (e.g., RP) via the CIMOM 64. A client may thus continuously monitor its own machine and one or more remote machines via a single straightforward API call. This is transparent to the client process 62, however, (other than possibly some extra delay time), as the client process 62 simply places objects into a refresher, and calls the Refresh ( ) API as desired to get updates provided thereto. The client process 62 may thus mix various combinations of local regular, local high-performance and remote providers in the refresher 74, and the proxy 68 and the CIMOM 64 transparently handle the updating in the appropriate manner.

Figure 8:
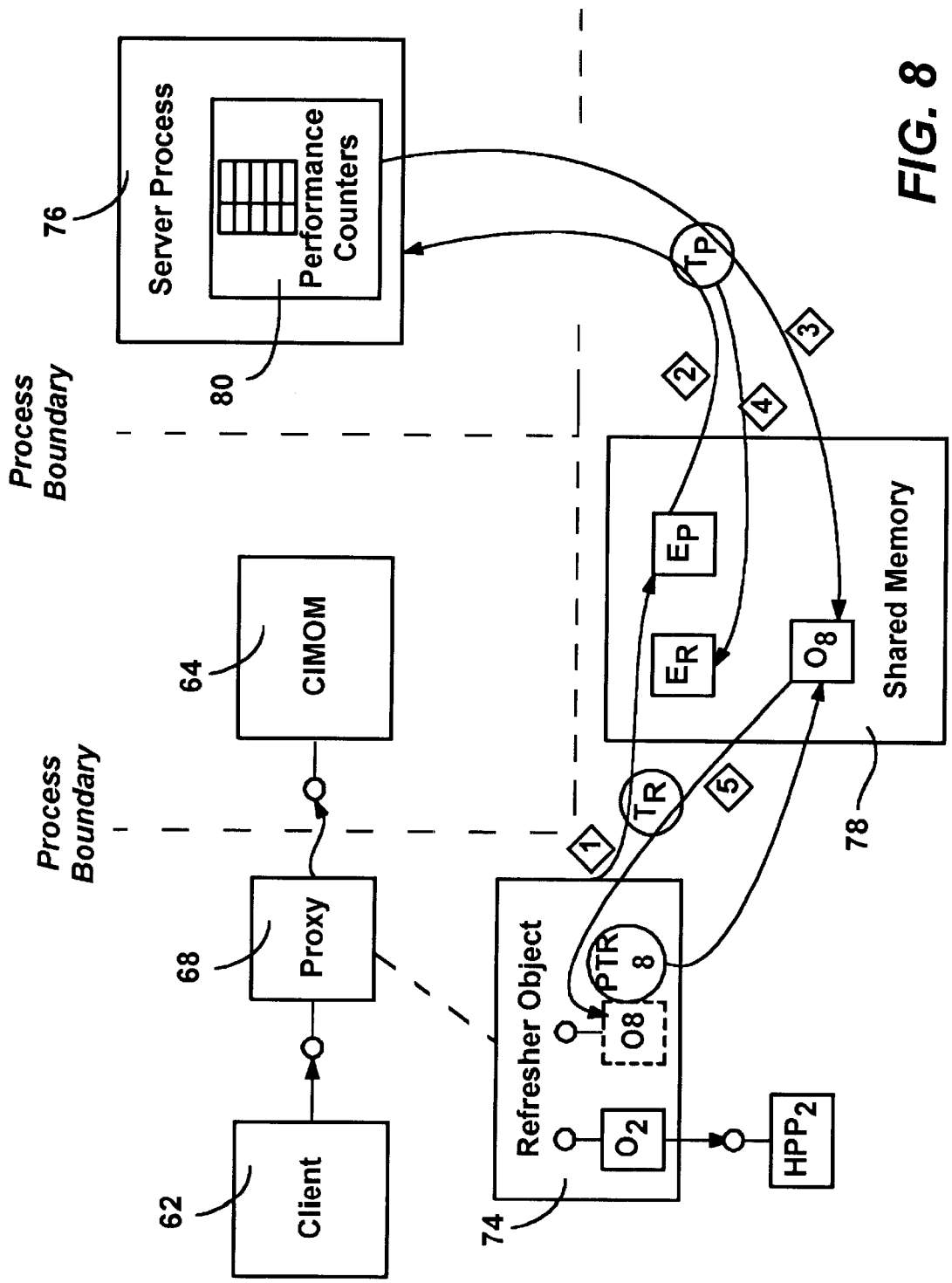
FIG. 8 is a block diagram generally representing a general architecture for performance monitoring via shared memory in accordance with an aspect of the present invention.

Another aspect of the present invention involves high-performance providers that are local, yet are incorporated into a server process for monitoring that server process and thus cannot efficiently obtain their information when loaded into the client process 62. For example, as shown in FIG. 8, SQL or database servers, E-mail Server applications running as background services and so on may have performance counters built into. For example, a SQL server is a separate process that includes performance counters for information such as how many users are logged on, the number of accesses per second, the number of pages going in and out of its databases and so on.

In accordance with one aspect of the present invention, shared memory techniques are used to avoid the performance degradation that occurs with crossing process boundaries with such separate servers. To this end, each object (e.g., $O_8$ of FIG. 8) corresponding to this server process 76 are housed in shared memory location 78, and the refresher 74 includes a shared memory manager that knows to read such objects $O_8$ from the shared memory 78 rather than obtain them from a provider. The process 76 that includes the performance counters 80 only need makes calls in its own process space (via its own thread $T_p$) to update the object $O_1$ in the shared memory 78, in agreement with the refresher 74. More particularly, the refresher 74 maintains a pointer (PTR1) to each such object, and when refresh occurs, signals the server process 76 to update the object or objects in the shared memory space 78. The server process 76 does the update, and signals the refresher 74 when complete, whereby the refresher 74 reads the objects in the shared memory 78 via its own thread $T_R$.

Figure 9:
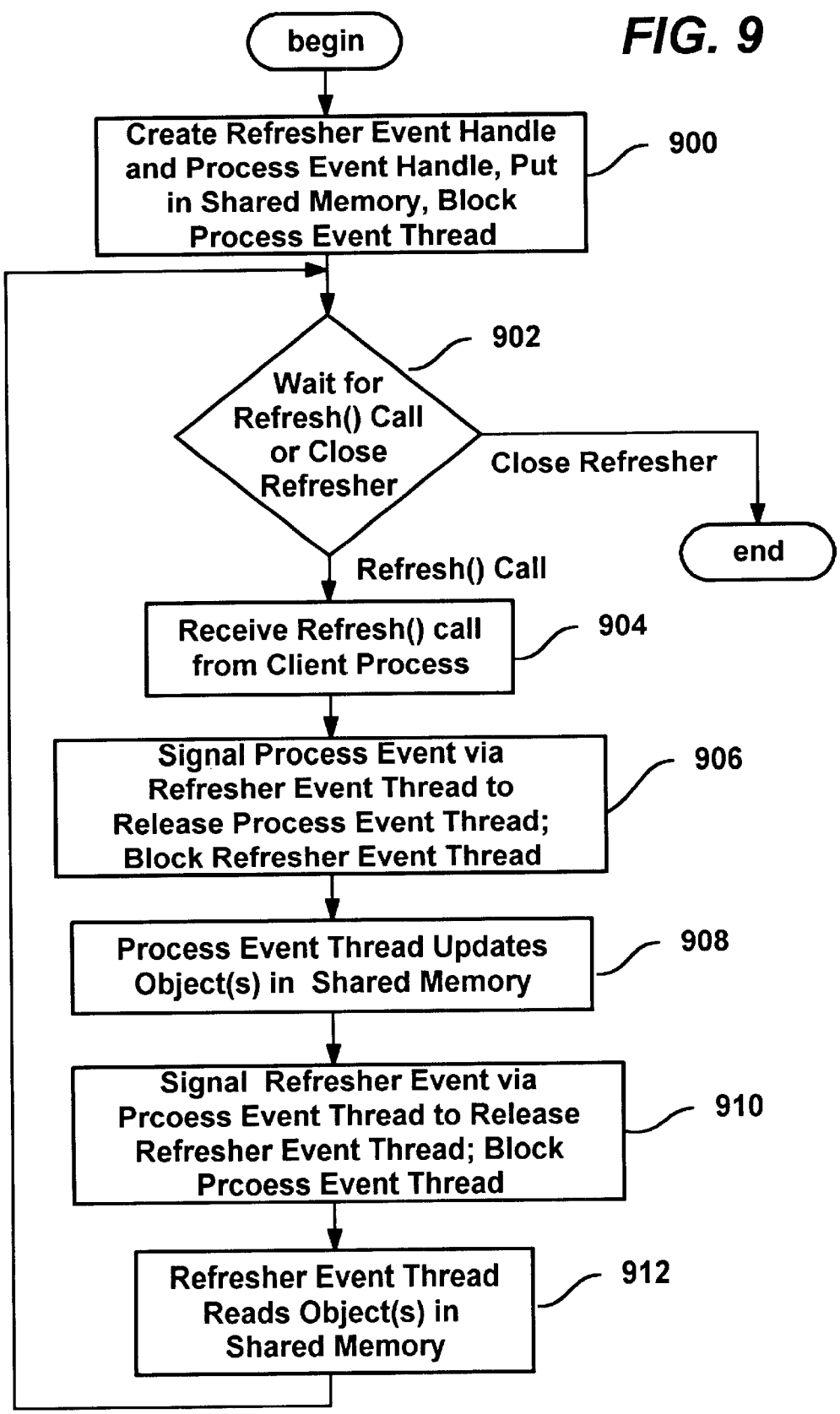
FIG. 9 is a flow diagram generally representing a process for updating objects via the shared memory architecture of FIG. 8 in accordance with an aspect of the present invention.

To avoid conflicts such as writing to an object while it is being read, and also so that only those objects that are being monitored are updated, events are used. More particularly, as represented in FIG. 8 and the flow diagram of FIG. 9 events $E_R$ and $E_P$ (via event handles) are put into the shared memory 78 so that the refresher 74 thread $T_R$ and process thread $T_p$ can signal one another via "interlocked events." Step 902 represents the waiting for a refresh call, during which time the threads $T_R$ and $T_p$ are blocking. When a call is received at step 904, the refresher 74 unblocks its thread $R_T$ at step 906 to signal the process event $E_p$, also represented in FIG. 8 by the diamond numbered one ("1"), after which the refresher 74 thread $R_T$ blocks. This signal unblocks the process thread $T_p$, which at step 908 updates the object (or objects) $O_8$ in the shared memory 78, also show in FIG. 8 by the diamonds numbered two (2) and three (3). When the update is complete, the process thread $T_p$ signals the event handle $E_R$ of the refresher 74 and then blocks (step 910) as also represented by the diamond numbered four (4) in FIG. 8. This signal releases the refresher 74 thread $T_R$, which then reads the object $O_8$ from the shared memory 78 for returning to the client process 62, as represented in FIG. 9 via step 912 and in FIG. 8 via the diamond numbered five (5).

In this manner, performance monitors that are tied to a process are able to be accessed efficiently in a CIM environment or the like. Again, this is transparent to the client process, which simply places a result object in a refresher and calls refresh when an update is desired. While less efficient than the use of high performance providers in the client process space, the shared memory technique has been found to provide acceptable results for performance monitoring.

Note that the refresher 74 may have a mix of objects, including those updated via a high performance provider (e.g., $HPP_2$) in the client process space and via the shared memory, as well as via local providers and remote providers via the CIMOM 64 as described above. Also, although not specifically shown in FIG. 8, more than one event pair may be used so that, for example, multiple refreshers may use the shared memory technique and/or different objects in the same refresher may be updated independently.

As can be seen from the foregoing detailed description, there is provided a method and architecture for high performance system monitoring in a system management environment. Through the use of a refresher/proxy, the method and architecture are transparent, flexible and straightforward from the perspective of a client process, and highly efficient in the system.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for monitoring for system information, comprising:
   receiving, at a central information mechanism, a request for system information from a client process;
   obtaining, at the central information mechanism, the system information from at least one provider;
   returning the system information to the client process;
   receiving information indicating that the client process wants monitoring of the system information; and
   loading at least one provider in a process space of the client process.

2. The method of claim 1 wherein receiving a request for system information includes receiving a call from a proxy.

3. The method of claim 1 wherein obtaining the system information from at least one provider includes determining which of a plurality of providers correspond to the request information.

4. The method of claim 1 wherein returning the system information to the client process includes returning an object thereto.

5. The method of claim 1 wherein receiving information indicating that the client process wants monitoring of the system information includes receiving a signal at the central information mechanism.

6. The method of claim 1 wherein receiving information indicating that the client process wants monitoring of the system information includes adding an object having the information associated therewith to a refresher.

7. The method of claim 6 wherein receiving information indicating that the client process wants monitoring of the system information includes receiving a signal at the central information mechanism via a call from a proxy.

8. The method of claim 7 wherein adding the object to a refresher initiates the signal.

9. The method of claim 8 wherein the proxy and the refresher comprise the same component.

10. The method of claim 1 wherein loading at least one provider in a process space of the client process includes loading a high performance provider.

11. The method of claim 1 further comprising, updating system information via the at least one provider.

12. The method of claim 1 wherein updating the system information includes receiving a call from the client process at a proxy, and communicating with the at least one provider.

13. A computer-readable medium having computer-executable instruction for performing the method of claim 1.

14. A system for providing performance information to a client process, comprising, a provider of performance information, a central information mechanism connected for communication with the provider, a proxy connected for communication with the client process and for communication with the central information mechanism to return an object having performance information therein to the client process, and a refresher associated with the proxy, the client process adding the object to the refresher, and the proxy updating the object in the refresher with performance information independent of a call to the central information mechanism.

15. The system of claim 14 wherein the proxy updates the object in the refresher in response to a request from the client process.

16. The system of claim 14 wherein the proxy updates the object in the refresher via an instance of the provider loaded in the client process space.

17. The system of claim 14 wherein the proxy updates the object in the refresher via an object in a memory location shared with a server process.

18. The system of claim 14 further comprising a second object, and wherein the proxy updates the second object via a call to the central information mechanism.

19. The system of claim 18 wherein the second object corresponds to a local provider of system information.

20. The system of claim 18 wherein the second object corresponds to a remote provider.

21. The system of claim 20 wherein the remote provider provides performance information.

22. The system of claim 14 wherein the proxy provides a signal to the central information mechanism when the object is added to the refresher, and the central information mechanism loads an instance of the provider into a process space of the client process in response to the signal.

23. The system of claim 14 wherein the proxy and the refresher comprise the same component.

24. The system of claim 14 further comprising a second refresher having at least one other object therein.

25. The system of claim 24 wherein the object in the refresher and the other object in the second refresher are updated at different rates relative to one another.

26. The system of claim 24 wherein the refresher and the second refresher are merged.

27. The system of claim 14 wherein the client process corresponds to a management application.

28. A method for providing system information including performance information to a client process, comprising, receiving a request for system information from the client process, communicating with a provider via a central information mechanism to obtain the information, returning a first object to the client process having the system information therein, receiving the first object in a refresher, and updating the first object in the refresher independent of the central information mechanism.

29. The method of claim 28 wherein updating the first object in the refresher includes receiving a call from the client process.

30. The method of claim 28 further comprising, loading an instance of the provider in a client process space, and wherein updating the first object in the refresher includes communicating with the instance.

31. The method of claim 28 wherein updating the first object in the refresher includes signaling a server process to update information in a shared memory location.

32. The method of claim 31 wherein signaling a server process to update information in a shared memory location includes providing an event associated with the refresher, signaling an event associated with the server process, and blocking until the event associated with the server process signals the event associated with the refresher.

33. The method of claim 32 further comprising reading the information in the shared memory location when the server process signals the event associated with the refresher.

34. The method of claim 28 further comprising, receiving a second object in the refresher, and updating the second object.

35. The method of claim 34 wherein the second object has a high-performance provider associated therewith in the client process space.

36. The method of claim 34 wherein updating the second object includes communicating with the central information mechanism.

37. The method of claim 36 wherein the central information mechanism provides an updated second information object.

38. The method of claim 36 wherein the central information mechanism provides an updated second information object via communication with a provider over a network connection.

39. The method of claim 28 further comprising, receiving a second refresher in the refresher, and updating a second object set in the refresher.

40. The method of claim 28 wherein updating the first object in the refresher includes signaling a server process via interlocked events to update information in a shared memory location.

41. A computer-readable medium having computer-executable instruction for performing the method of claim 28.

* * * * *